US010060550B2

United States Patent
Dubus et al.

(10) Patent No.: US 10,060,550 B2
(45) Date of Patent: Aug. 28, 2018

(54) VALVE OPERATOR ASSEMBLY WITH FRICTION MEANS AND PRE-STRESSING ELEMENT

(71) Applicant: AKTIEBOLAGET SKF, Gothenburg (SE)

(72) Inventors: Jérôme Dubus, La Riche (FR); Christian Boch, Bassens (FR)

(73) Assignee: AKTIEBOLAGET SKF, Gothenburg (SE)

( * ) Notice: Subject to any disclaimer, the term of this patent is extended or adjusted under 35 U.S.C. 154(b) by 85 days.

(21) Appl. No.: 15/038,117

(22) PCT Filed: Nov. 21, 2013

(86) PCT No.: PCT/EP2013/074374
§ 371 (c)(1),
(2) Date: May 20, 2016

(87) PCT Pub. No.: WO2015/074701
PCT Pub. Date: May 28, 2015

(65) Prior Publication Data
US 2016/0281879 A1 Sep. 29, 2016

(51) Int. Cl.
*F16K 31/50* (2006.01)
*F16K 35/04* (2006.01)
*F16H 25/22* (2006.01)
*F16H 25/24* (2006.01)

(52) U.S. Cl.
CPC .......... *F16K 35/04* (2013.01); *F16H 25/2252* (2013.01); *F16K 31/504* (2013.01); *F16K 31/508* (2013.01); *F16H 25/2454* (2013.01)

(58) Field of Classification Search
CPC ...... F16K 35/04; F16K 34/504; F16K 31/508; F16H 25/2252; F16H 25/2454
USPC ........................................................ 251/297
See application file for complete search history.

(56) References Cited

U.S. PATENT DOCUMENTS

2014/0003914 A1* 1/2014 Namous .................... F16D 7/08
 415/123
2014/0054487 A1* 2/2014 Namous ................ F16K 3/0254
 251/326

FOREIGN PATENT DOCUMENTS

WO 2003019058 A1 3/2003
WO 2012088008 A1 6/2012

* cited by examiner

*Primary Examiner* — Marina Tietjen
(74) *Attorney, Agent, or Firm* — 2SPL Patentanwälte PartG mbB; Mani Arabi

(57) ABSTRACT

The valve operator assembly is provided for a valve and includes a housing, an input member rotatably mounted, and a transmission mechanism including a translating element and a rotating element connected to the input member, said transmission mechanism being adapted to convert applied rotation of the input member into axial translation of said translating element.
The assembly further includes at least one locking mechanism radially interposed between the transmission mechanism and the housing, and provided with friction means in radial contact with the housing, and with at least one pre-stressing element acting on said friction means to maintain said radial contact. The pre-stressing element and the friction means cooperate together to lock the transmission mechanism with the housing in a static position of said assembly.

16 Claims, 5 Drawing Sheets

Figure 1:
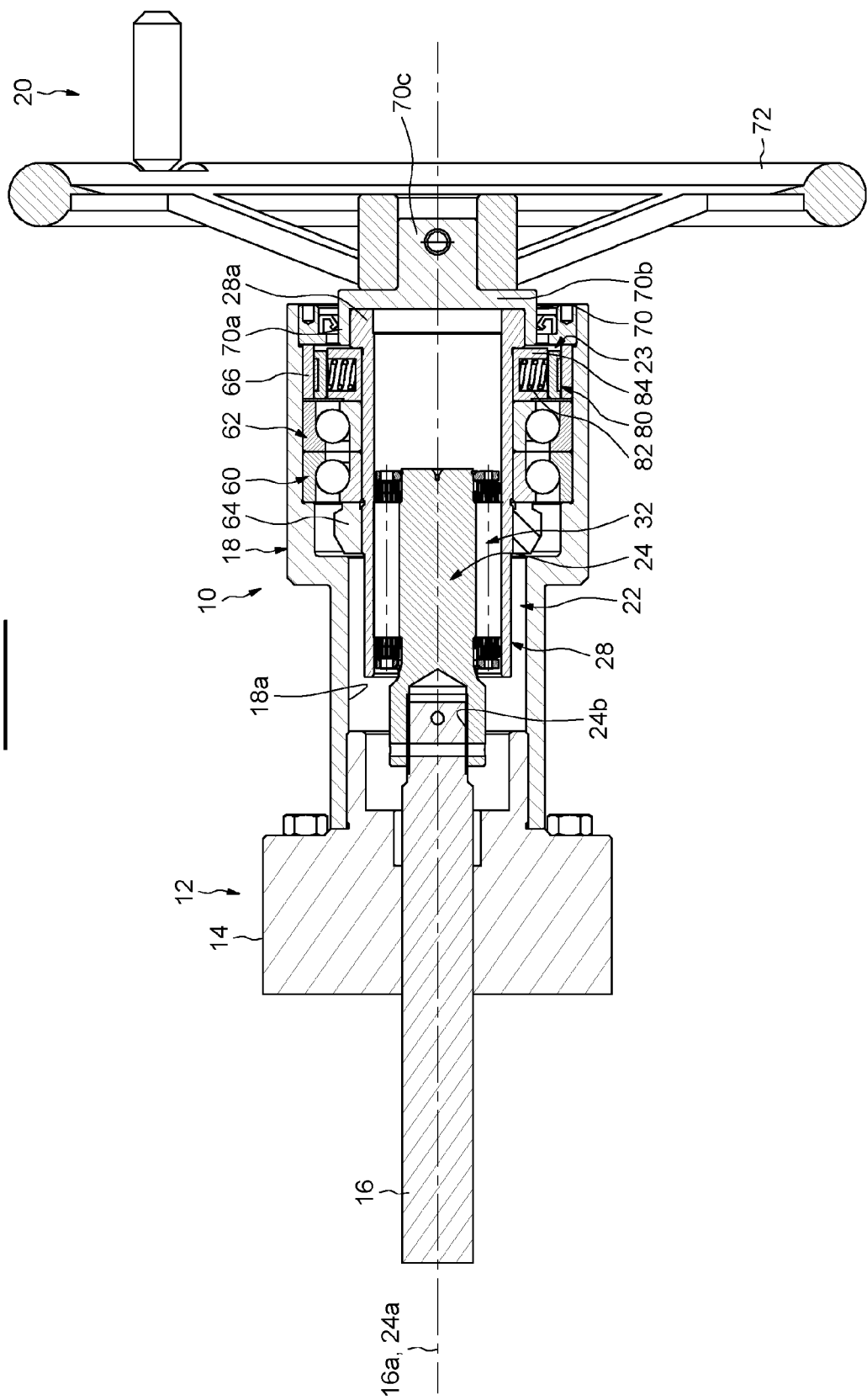

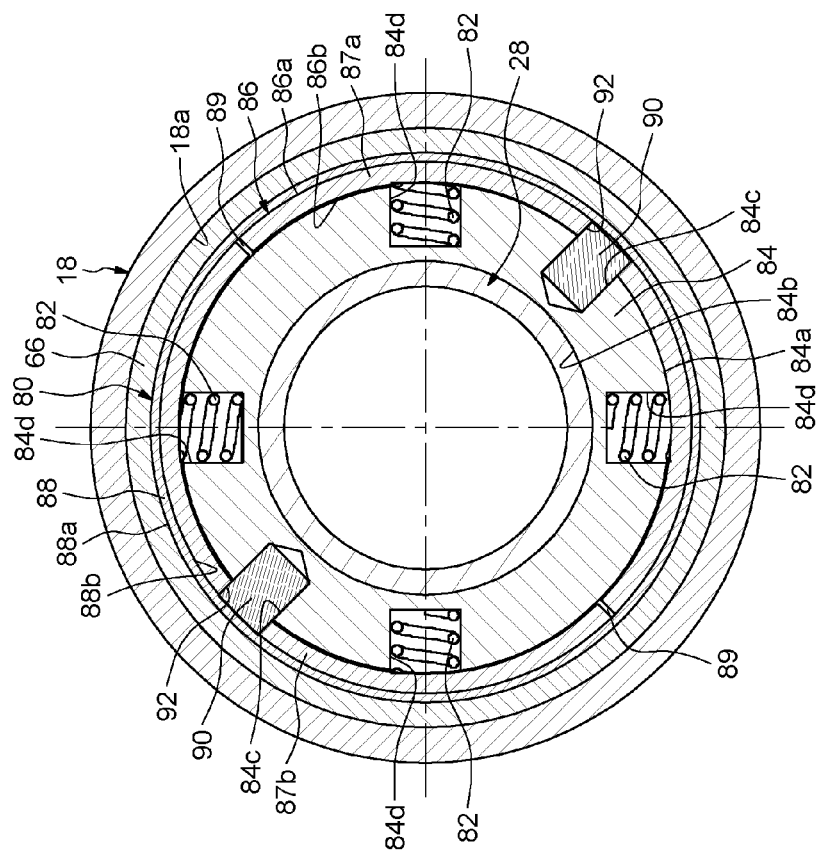
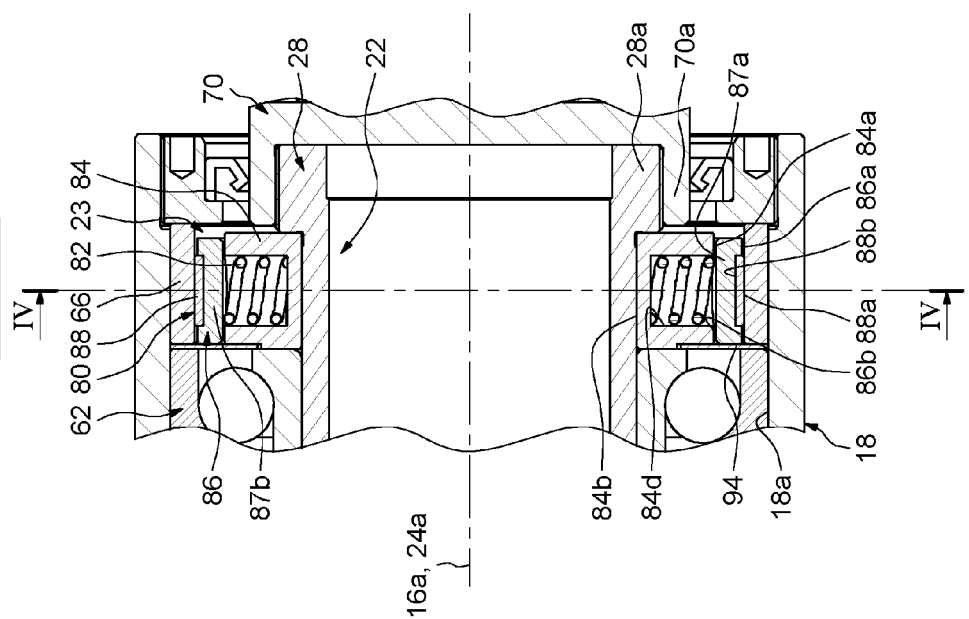

VALVE OPERATOR ASSEMBLY WITH FRICTION MEANS AND PRE-STRESSING ELEMENT

The present, invention relates to the fields of valves and manually operable valves, for instance gate valves, control or regulation valves or chokes valves. More particularly, the invention relates to a valve operator assembly for a gate valve.

Valves are used in a variety of industries to control the flow of fluids. In particular, gate valves are used extensively in the oil and gas industry to control the flow of produced fluids at various stages of production. Most gate valves used in this industry comprise a valve body having a longitudinal flow bore and a transverse gate cavity that intersects the flow bore. A gate having a gate opening extending transversely therethrough is disposed in the gate cavity. A valve stem is provided for moving the gate between an open position, in which the gate opening is aligned with the flow bore, and a closed position, in which the gate opening is offset from the flow bore. The gate cavity of the valve body is covered by a bonnet having an axial bore through which passes the valve stem.

Such a gate valve is associated to a valve operator assembly for selectively driving the valve stem up and down in order to close and open the gate valve. A gate valve may be manually actuated. In this case, the valve operator assembly generally comprises a transmission mechanism to convert the rotational motion of a hand-wheel into axial motion of the valve stem. To quickly open and close the gate valve with a minimum number of turns, the transmission mechanism may be a ball screw mechanism or a planetary roller screw mechanism in order to reduce the operating torque, for instance manual hand-wheel torque or powered with electric drive for surface valves or with remote operating vehicle (ROV) or electric actuation for subsea valves. For more details, it is possible for example to refer to the patent EP-B1-1 419 334 (SKF).

Since such a screw mechanism is susceptible to back-drive under fluid pressure, the gate valve can be inadvertently opened or closed. Such back-driving can not only cause problems with the desired flow regulation, but can also lead to injury to an operator, for example from being struck by the rotating hand-wheel.

Accordingly, a balance system is generally provided on the valve body of the gate valve to prevent a back-driving of the transmission mechanism with the force exerted by the fluid. Such system comprises a balance stem disposed on the valve body and which is exposed to fluid pressure to offset or balance the force exerted on the gate.

However, it is necessary to modify the design of the valve body to integrate such a balance system on the gate valve. This leads to a complex structure of the gate valve. Besides, the required space for the gate valve is significantly increased.

One aim of the present invention is to overcome these drawbacks.

It is a particular object of the present invention to provide a valve operator assembly for valve, for instance gate valve, control or regulation valve or choke valve, which is not reversible or back-driveable.

In one embodiment, the valve operator assembly is provided for a valve comprising a valve body and a valve translating member axially moveable. The assembly comprises a housing adapted to be mounted on the valve, an input member rotatably mounted with respect to said housing and a transmission mechanism comprising a translating element adapted to be connected to the valve translating member of the valve and a rotating element connected to the input member. Said transmission mechanism is adapted to convert applied rotation of the input member into axial translation of said translating element. The assembly further comprises at least one locking mechanism radially interposed between the transmission mechanism and the housing. The locking mechanism comprises friction means in radial contact with the housing, or with the transmission mechanism, and at least one pre-stressing element acting radially on said friction means to maintain said radial contact. The pre-stressing element and the friction means cooperate together to lock the transmission mechanism with the housing in a static position of said assembly.

In a preferred embodiment, the friction means are adapted to create a friction torque between said friction means and the housing, or the transmission mechanism, so that the total friction torque of the assembly is greater than or equal to the backdriving torque of said transmission mechanism. Advantageously, the friction means may be adapted to create a friction torque which is greater than or equal to said backdriving torque.

In a preferred embodiment, the pre-stressing element acts radially on said friction means.

The friction means may be movable in radial direction relative to the transmission mechanism and to the housing under the action of the pre-stressing element. Preferably, the friction means are fixed together with the transmission mechanism, or with the housing, in circumferential direction.

The pre-stressing element may be mounted in radial contact with the friction means.

In one embodiment, the locking mechanism further comprises a support ring mounted on the transmission mechanism, or on the housing, and having at least a recess into which is mounted the pre-stressing element. The friction means may be mounted in radial contact with the support ring. Advantageously, the pre-stressing element is radially located between the support ring and the friction means.

The friction means may comprise a friction ring radially bearing against the housing, or the transmission mechanism. The friction means may further comprise a support member onto which is mounted the friction ring radially on the side opposite to the pre-stressing element. Preferably, the support member is deformable at least in radial direction.

In one embodiment, the friction means are in radial contact with the housing and the pre-stressing element is radially interposed between said friction means and the transmission mechanism, said pre-stressing element exerting a radial force oriented outwards. Alternatively, the friction means are in radial contact with the transmission mechanism and the pre-stressing element is radially interposed between said friction means and the housing, said pre-stressing element exerting a radial force oriented inwards.

In one preferred embodiment, the locking mechanism comprises a plurality of pre-stressing elements. The pre-stressing element(s) may comprise mechanical actuator(s).

The transmission mechanism may further comprise an adapter sleeve connected to the rotating element of said mechanism and onto which is mounted the input member. In one embodiment, the locking mechanism is mounted between the rotating element of the transmission mechanism and the housing. Alternatively, the locking mechanism may be mounted between the adapter sleeve and the housing.

In one embodiment, the transmission mechanism comprises a screw, a nut surrounding and coaxial with said screw, and a plurality of rolling elements radially disposed between the screw and the nut. Each rolling element may be engaged in both outer and inner threads provided on the screw and the nut.

In one embodiment, the screw forms the translating element and the nut is connected to the input member. Alternatively, the nut may form the translating element and the screw is connected to the input member.

Preferably, the valve operator assembly further comprises at least one rolling bearing radially disposed between the transmission mechanism and the housing.

The invention also relates to a valve, notably a gate valve, a control or regulation valve or a choke valve comprising a valve body, a valve translating member axially moveable and a valve operator assembly as previously defined. The valve translating member may be a valve stem or a piston for instance.

Figure 2:
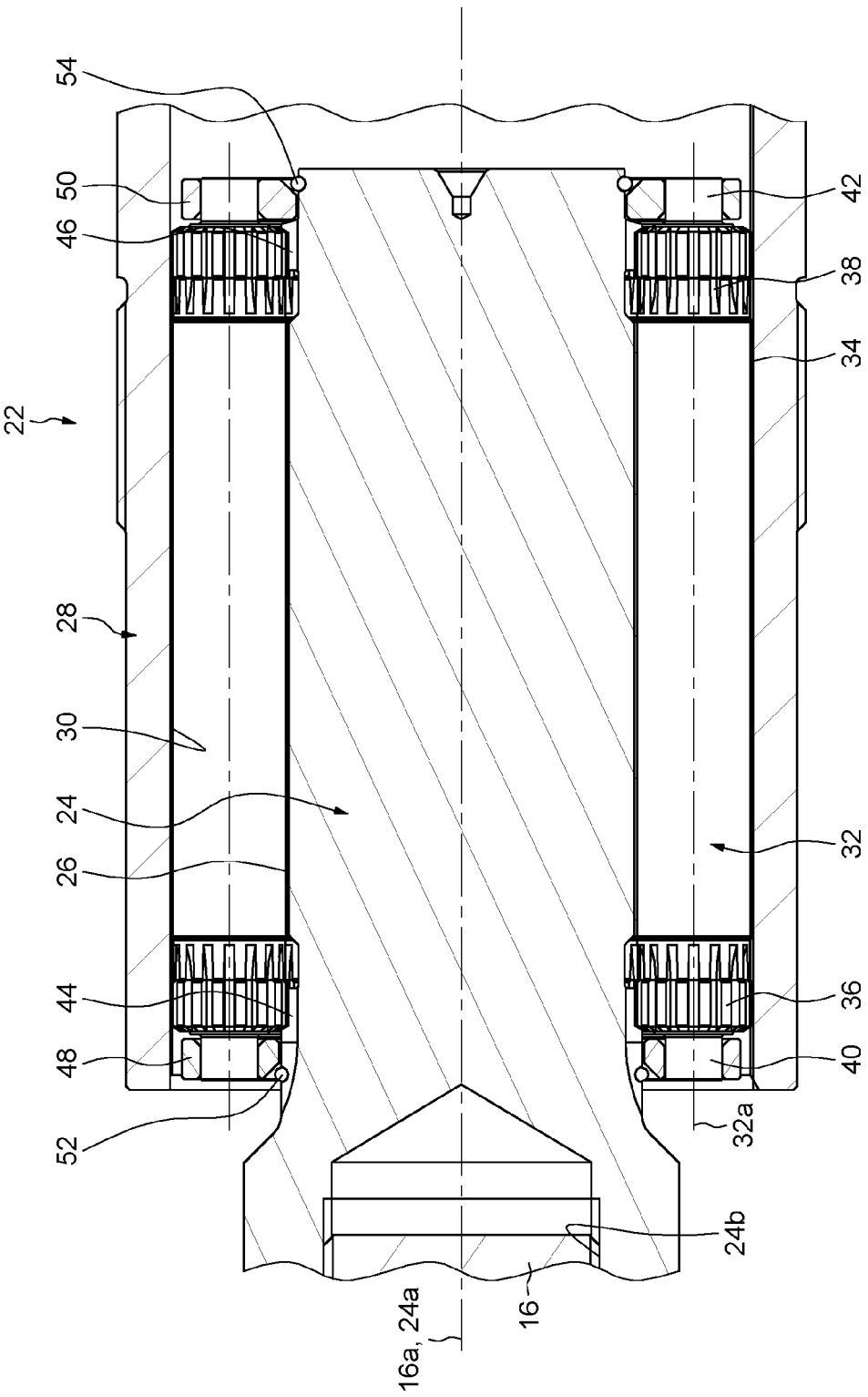
Figure 5:
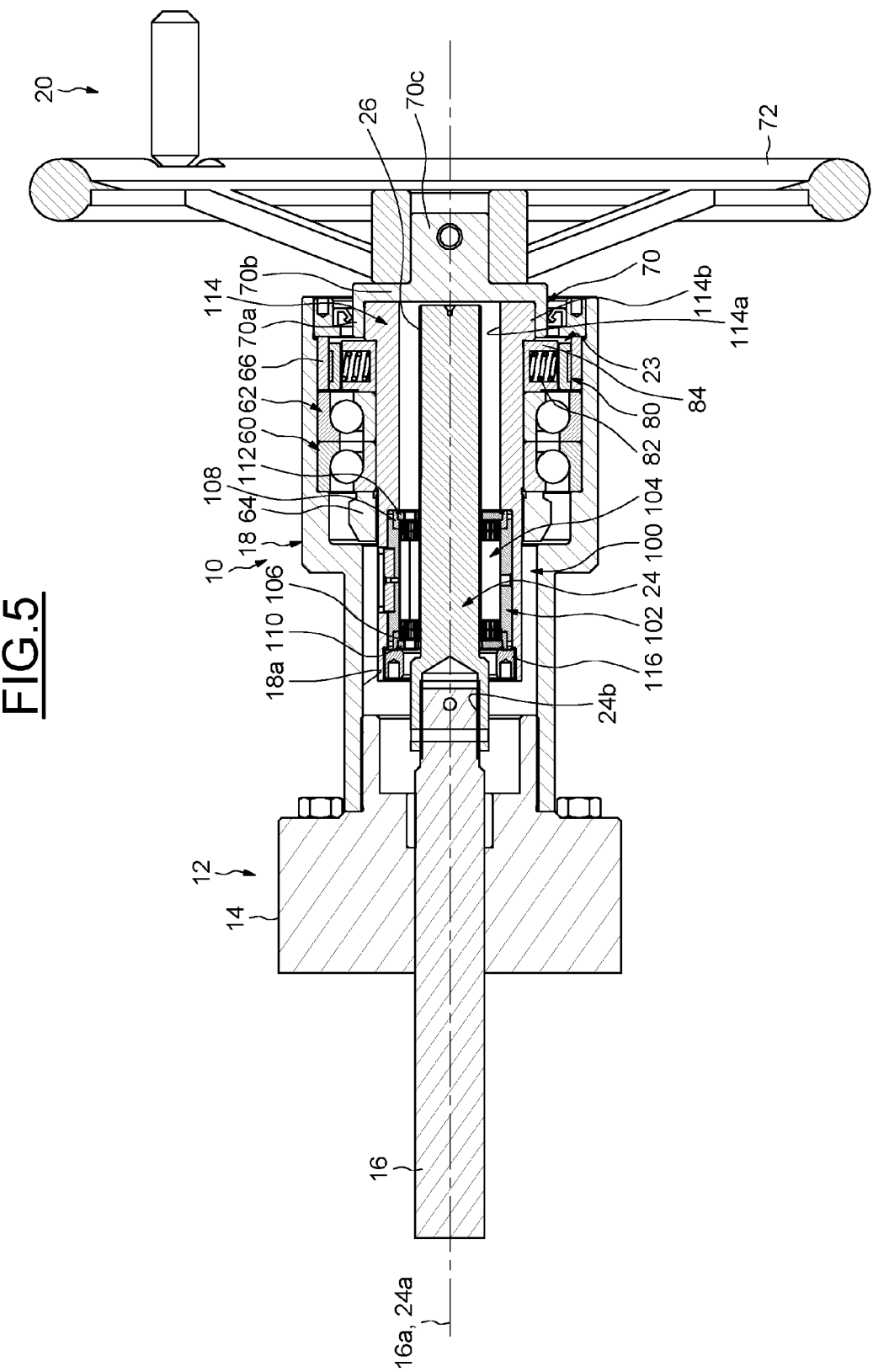
Figure 6:
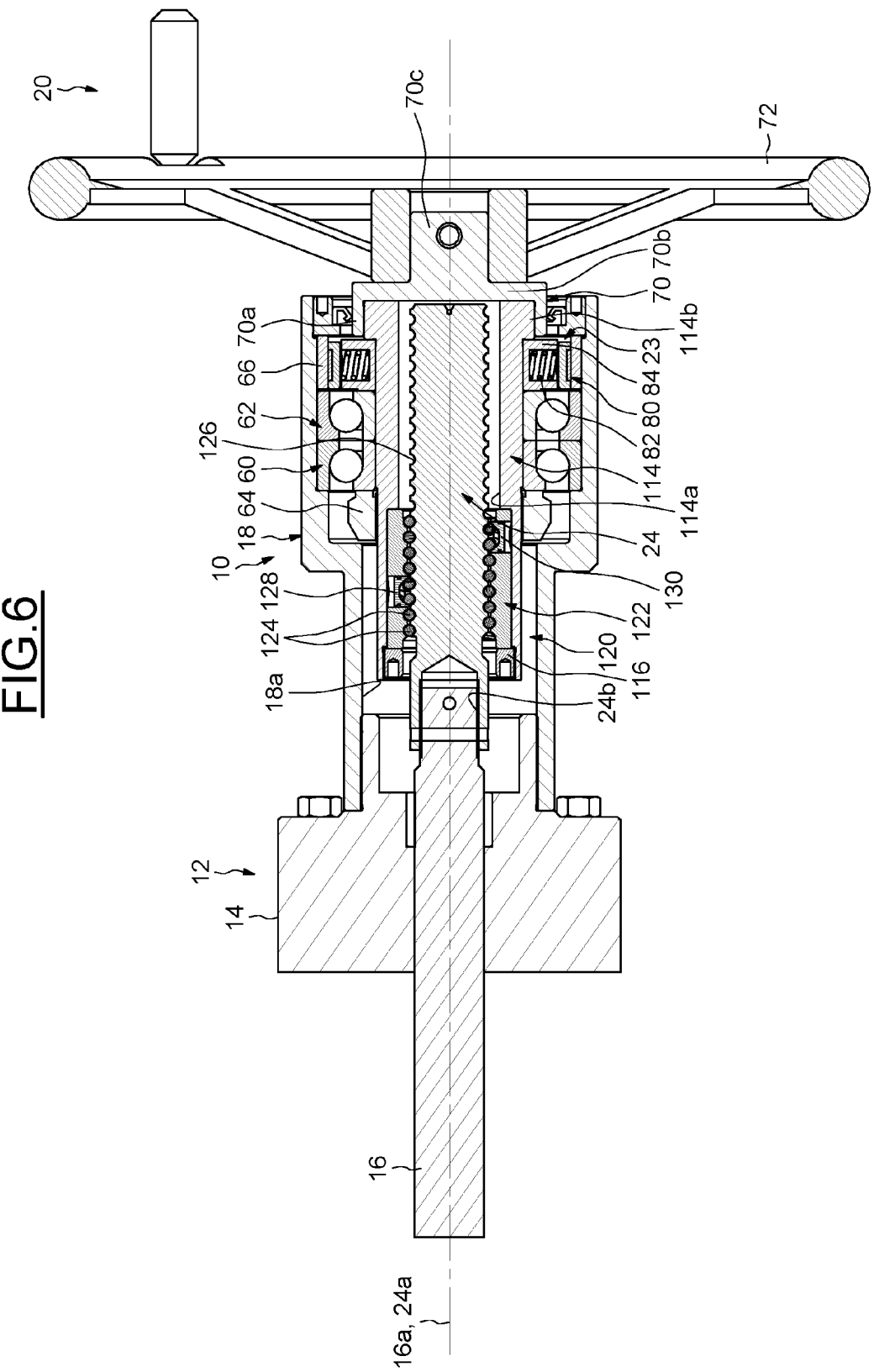

The present invention and its advantages will be better understood by studying the detailed description of specific embodiments given by way of non-limiting examples and illustrated by the appended drawings on which:

FIG. 1 is a cross-section of a valve operator assembly for gate valve according to a first example of the invention, FIG. 2 is a cross-section of an inverted roller screw mechanism of the assembly of FIG. 1, FIG. 3 is a detail view of FIG. 1, FIG. 4 is a section on IV-IV of FIG. 3, FIG. 5 is a cross-section of a valve operator assembly for gate valve according to a second example of the invention, and FIG. 6 is a cross-section of a valve operator assembly for gate valve according to a third example of the invention.

A valve operator assembly 10 as shown on FIG. 1 is adapted for a gate valve 12 provided with a bonnet 14, a valve body (not shown) covered by said bonnet and a moveable valve stem 16 with an axis 16a. Conventionally, the valve body has a flow bore and a transverse gate cavity that intersects the flow bore. The gate valve also comprises a gate having a gate opening extending transversely therethrough is disposed in the gate cavity. For more detail on such a gate valve, it could be referred to EP-B1-1 419 334 (SKF) which is hereby incorporated by reference.

The valve operator assembly 10 comprises a tubular housing 18 mounted on the bonnet 14 of the gate valve, an input member 20 rotatably mounted with respect to said housing, and an inverted roller screw mechanism 22 interposed between said input member and the valve stem 16 of said valve to convert a rotational motion of the input member 20 into axial motion of the valve stem. The inverted roller screw mechanism 22 is mounted into a bore 18a of the housing and is connected to the input member 20. One axial end of the housing 18 is secured to the bonnet 14 by threads (not referenced). In the illustrated example, the bore 18a has a stepped form.

As will be described later, the valve operator assembly 10 further comprises a locking mechanism 23 radially interposed between the housing 18 and the inverted roller screw mechanism 22 and adapted to prevent the back-driving of such mechanism under fluid pressure exerted on the valve stem 16.

As shown more clearly on FIG. 2, the inverted roller screw mechanism 22 comprises a screw 24, with an axis 24a coaxial with the axis 16a of the valve stem 16, provided with an outer thread 26, a nut 28 mounted coaxially about the screw 24 and provided with an inner thread 30, the internal diameter of which is greater than the external diameter of the outer thread 26, and a plurality of longitudinal rollers 32 disposed radially between the screw 24 and the nut 28.

The screw 24 extends longitudinally through a cylindrical bore of the nut 28 on which the inner thread 30 is formed. The nut 28 has a tubular form and is elongated to accommodate the full extent of screw travel. Axially on the side opposite to the input member 20 (FIG. 1), a recess 24b is formed on a frontal radial surface of the screw 24 and into which is fixed an end of the valve stem 16 of the gate valve. The valve stem 16 is connected to the screw 24 by any appropriate means, for example by threads and/or a pin.

The rollers 32 are identical to each other and are distributed regularly around the screw 24. Each roller 32 extends along an axis 32a which is coaxial with the axis 24a of the screw and comprises an outer thread 34 engaging the thread 26 of the screw and the thread 30 of the nut. Each roller 20 also comprises, at each axial end, outer gear teeth 36, 38 extending axially outwards the outer thread 34 and which are themselves extended axially by a cylindrical stud 40, 42 extending outwards. Each gear teeth 36, 38 are axially located between the associated stud 40, 42 and the outer thread 34. The outer thread 34 of each roller is axially located between the two gear teeth 36, 38.

The roller screw mechanism 22 also comprises two annular gear wheels 44, 46 provided on the outer surface of the screw 24 and each comprising outer gear teeth meshing the gear teeth 36, 38 respectively of the rollers 32 for the synchronization thereof. Each gear wheel 44, 46 is axially located near to an end of the outer thread 26 of the screw. Said outer thread 26 is axially located between the two gear wheels 44, 46. In the disclosed embodiment, the gear wheels 44, 46 are formed directly on the outer surface of the screw 24. Alternatively, the gear wheels may be separate parts which are fixed onto the screw 24.

The mechanism 22 further comprises two annular guides or spacer rings 48, 50 disposed on the outer surface of the screw 24. Said spacer rings 48, 50 are radially disposed between the screw 24 and the inner thread 30 of the nut without contact with said thread. Each spacer ring 48, 50 is mounted on the outer surface of the screw 24 axially next to the associated gear wheel 44, 46. Each spacer ring 48, 50 is axially offset towards the outside of the nut 28 with regard to the associated gear wheel 44, 46. Each spacer ring 48, 50 comprises a plurality of cylindrical through-recesses (not referenced) which are distributed regularly in the circumferential direction and inside which the studs 40, 42 of the rollers are housed. The spacer rings 48, 50 enable the rollers 32 to be carried and the regular circumferential spacing thereof to be kept. The mechanism 22 further comprises elastic retainer rings 52, 54 each mounted in a groove (not referenced) formed on the outer surface of the screw 24 in order to axially hold the corresponding spacer ring 48, 50.

Referring once again to FIG. 1, the roller screw mechanism 22 further comprises an adapter sleeve 70 mounted on the nut 28. The sleeve 70 comprises an annular axial portion 70a secured to the flange 28a of the nut by any appropriate means, for example by threads, a radial portion 70b extending radially inwards said axial portion 70a and bearing axially against the end of the nut, and a pin 70c projecting axially outwards from said radial portion 70b. Sealing means (not referenced) are provided between the axial portion 70a of the sleeve and the bore of the housing 18. In the illustrated example, the input member 20 comprises an operable hand-wheel 72 secured to the sleeve 70. The hand-wheel 72 is here secured onto the pin 70c of the sleeve. Said hand-wheel forms a rotational drive input.

The valve operator assembly 10 further comprises two rolling bearings 60, 62 to guide the rotation of the nut 28 of the inverted roller screw mechanism relative to the housing 18. The rolling bearings 60, 62 are radially mounted between the outer surface of the nut 28 and the stepped bore 18a of the housing. The rolling bearings 60, 62 are mounted radially in contact with the outer surface of the nut 28 and a large diameter portion of the stepped bore 18a of the housing. In the disclosed example, the rolling bearings 60, 62 are angular contact thrust ball bearings and are axially in contact one to another. A retaining ring 64 is secured on the outer surface of the nut 28 and axially bears against the rolling bearing 60 axially on the side opposite to the rolling bearing 62. Axially on the opposite side, the rolling bearing 62 is axially mounted against a flange 28a of the nut 28 extending radially outwards the outer surface of said nut. The flange 28a is axially located at an axial end of the nut. The assembly 10 further comprises an annular ring 66 secured onto the bore 18a of the housing. The ring 66 is axially located near to the rolling bearing 62.

In the illustrated example, the locking mechanism 23 is located axially between the rolling bearing 62 and the sleeve 70. The locking mechanism 23 is coaxial with the axis 24a of the screw. The locking mechanism 23 is radially disposed between the ring 66 secured to the housing 18 and the nut 28 of the inverted roller screw mechanism. The locking mechanism 23 comes into radial contact with the nut 28 and with the housing 18. A "radial contact" is to be understood as a direct radial contact with the transmission mechanism 22 or with the housing 18, or as an indirect radial contact with the transmission mechanism 22 Or with the housing 18 by means of a part fixed onto said transmission mechanism or housing. Alternatively, the contact between the locking mechanism 23 and the housing 18 and/or the transmission mechanism 22 could be a combination of radial and axial contact, for instance in cases where there is a small taper. In these cases, there is still a radial contact.

As shown more clearly on FIGS. 3 and 4, the locking mechanism 23 comprises friction means 80 in radial contact with the ring 66 of the housing and a plurality of elastic springs 82 radially disposed between said friction means and the nut 28 of the transmission mechanism. The locking mechanism 23 further comprises a support ring 84 mounted on the nut 28 for the mounting of the elastic springs 82. The elastic springs 82 are radially interposed between the support ring 84 and the friction means 80. The friction means 80 are distinct from the elastic springs 82 and from the support ring 84. The friction means 80 radially surround the elastic springs 82 and the support ring 84.

As will be described later, the friction means 80 are movable in the radial direction relative to the transmission mechanism 22 and to the housing 18 under the action of the springs 82. The friction means 80 are frictionally engaged with the housing 18 and are mounted on the nut 28 by the means of the support ring 84.

In the illustrated example, the friction means 80 are mounted radially on the support ring 84. The friction means 80 comprise a support member 86 and a friction ring 88 mounted onto said support member. The friction ring 88 is secured to the support member 86 by any appropriate means. The support member 86 is radially disposed between the sleeve 66 of the housing and the support ring 84. The support member 86 is provided with an outer surface 86a which radially faces the sleeve 66 while remaining radially distant from the latter, and with an opposite bore 86b in radial contact with the support ring 84. The support member 86 is mounted radially on the support ring 84. In the illustrated example, the support member 86 consists of two parts or half-rings 87a, 87b which face in the circumferential direction. A slight circumferential gap 89 is provided between each end of the half-ring 87a and the associated end of the other half-ring 87b. In this example, the half-rings 87a, 87b are identical and symmetrical with respect to the radial plane of passing through the centre of the nut 28 in order to reduce the manufacturing costs. As an alternative, it is also possible to foresee two parts 87a, 87b non-symmetric. For example, the support member 86 may be made from metal.

As will be described later, the friction ring 88 is adapted to create a friction torque between the friction means 80 and the housing 18 so that the total friction torque of the assembly 10 is greater than or equal to the backdriving torque of the transmission mechanism 22. The friction ring 88 is disposed into a groove (not referenced) formed on the outer surface 86a of the support member and which is oriented radially towards the housing 18. The friction ring 88 radially protrudes relative to the outer surface 86a and bears radially against the sleeve 66 of the housing. The friction ring 88 is disposed radially between the housing 18 and the support member 86. The friction ring 88 has an annular form and is frictionally engaged with the housing 18. The friction ring 88 is provided with a cylindrical outer surface 88a mounted in radial contact with the sleeve 66 of the housing and with an opposite cylindrical bore 88b mounted into the groove of the support member. Alternatively, it could be possible to not foresee the sleeve 66 secured to the housing 18. In this case, the friction ring 88 is directly mounted into radial contact with the housing 18. The friction ring 88 may be made from metal, from plastic material, from composite material or from combination of materials.

The support ring 84 is radially disposed between the nut 28 of the transmission mechanism and the friction means 80. The support ring 84 is secured on the outer surface of the nut 28 by any appropriate means. The support ring 84 has an annular form and comprises a cylindrical outer surface 84a mounted in radial contact with the support member 86 of the friction means, and an opposite cylindrical bore 84b in radial contact with the nut 28. For example, the support ring 84 may be made from metal. The support ring 84 further comprises two opposite radial lateral surfaces (not referenced) which axially delimit the outer surface 84a and the bore 84b. Said lateral surfaces are mounted into axial contact with the flange 28a of the nut and with the rolling bearing 62.

The support ring 84 comprises holes 84c of cylindrical shape formed on the outer surface 84a and extending radially inwards. In the illustrated example, the holes 84c are blind holes, two in number and diametrically opposed. A pin 90 is disposed into each hole 84c and protrudes radially relative to the outer surface 84a of the support ring.

Each pin 90 extends radially into a hole 92 made into the thickness of the associated part 87a, 87b of the support member 86. The friction means 80 are fixed together with the support ring 84 and the nut 28 of the transmission mechanism in the circumferential direction.

The support ring 84 further comprises a plurality of recesses 84d formed from the outer surface 84a and extending radially inwards. The recesses 84d are oriented radially towards the friction means 80. The recesses 84d are radially open outwards. In the illustrated example, the recesses 84d are distributed regularly from one another in the circumferential and are four in number.

The elastic springs 82 are each mounted into one of the recesses 84d. The elastic springs 82 are identical to one another. Each elastic spring 82 extends radially and is located radially between the support ring 84 and the friction means 80. Each elastic spring 82 is radially located on the side opposite to the friction ring 88 with regard to the support member 86. A first end of each spring 82 radially bears against the support ring 84. Each spring 82 radially bears against the nut 28 with the interposition of the support ring 84. A second opposite end of each spring 82 radially bears against the friction means 80. More precisely, said second end of the spring comes into contact with the bore 86b of the support member 86. In the illustrated example, each spring 82 is a compression spring and has in cross-section a circular profile. Alternatively, the springs may have in cross-section a different profile, for example a square one.

Each spring 82 exerts a permanent radial force on the friction means 80 which tends to push said friction means against the sleeve 66 of the housing. The springs 82 act on the two half-rings 87a, 87b of the friction means by exerting a radial preload. The radial force applied by the springs 82 pre-stresses the friction means 80 against the sleeve 66 of the housing 18 in order to maintain a radial contact therebetween.

The valve operator assembly also comprises a protective washer 94 axially interposed between the outer ring of the rolling bearing 62 and the sleeve 66. The washer 94 extends radially towards the inner ring of said bearing while remaining distant from the latter and from the support ring 84.

In a static position of the valve operator assembly 10, i.e. when no torque is applied on the hand-wheel 72, only a fluid pressure is exerted both on the valve stem 16 and the screw 24 of the transmission mechanism. The friction ring 88 creates a predetermined friction torque between the friction means 80 and the housing 18 so that the total friction torque of the assembly 10 is greater than or equal to the backdriving torque of the transmission mechanism 22 susceptible to occur under fluid pressure. Advantageously, the friction means 80 creates a friction torque which is greater than or equal to said backdriving torque. The material of the friction ring 86 and/or its length are determined in order to obtain the desired friction torque. The friction or braking torque between the housing 18 and the friction means 80, which are fixed with the nut 22 of the transmission mechanism in the circumferential direction, prevents a relative angular movement between said housing and friction means under fluid pressure. The nut 28 of the transmission mechanism is secured or locked with the fixed housing 18. The locking mechanism 23 acts as coupling means frictionally engage with the housing 18 so as to prevent a relative circumferential movement between said housing and the transmission mechanism 22 in a static position.

In a static position of the valve operator assembly 10, the prevention of the back-driving of the inverted roller screw mechanism 22 is guaranteed. The back-driving is not guaranteed by the roller screw mechanism 22 itself but by the assembly 10 comprising said mechanism and surrounding components including the friction means 80. Under fluid pressure exerted both on the valve stem 16 and the screw 24, the mechanism 22 is not reversible or back-driveable. The force exerted by the fluid is not transformed into an angular displacement of the nut 28 relative to the housing 18. Accordingly, it is possible to not foresee a balance system, such as a balance stem, on the valve body of the gate valve. Even with balanced design, the valve operator may also be used if the balance stem cannot fully balance the pressure in closed or open position. In this case, the small unbalance that may exist could be locked.

When an operator applies a torque on the hand-wheel 72, this torque is transmitted to the adapter sleeve 70 and then to the nut 28 of the inverted roller screw mechanism. Both the nut 28 and the friction means 80 rotate in the same direction relative to the housing 18. The sliding of the friction ring 88 of the friction means on the housing 18 generates a torque which increases the required torque on the hand-wheel 72. Such an additional friction torque exerted by the friction means 80 exists when the hand-wheel is manipulated according to the backdriving torque and also when a torque is applied in the opposite direction. Therefore, it is necessary to apply an extra torque to counter the friction torque of the friction means 80.

With the rotation of the nut 28, the rollers 32 rotate on themselves about the screw 24 and move axially and additionally rotate in the nut 28. The rollers 32 are rotationally guided by outer gear wheels 44, 46 provided on the screw and meshing with the gear teeth of the rollers. Both the rollers 32 and the screw 24 are axially or longitudinally moveable into the nut 28. Accordingly, the rotational motion of a hand-wheel 72 is converted into an axial motion of the valve stem 16 of the valve gate.

In the valve operator assembly 10, the friction means 80 secured on the nut 28 in the circumferential direction cooperates by friction with the fixed housing 18 to block the transmission mechanism 22 together with said housing when no torque is applied on the input member 20, i.e. when said input member remains at a particular angular position with regard to the housing 18. In such static position, the transmission mechanism 22 is rigidly connected to the housing 18 by the locking action of the friction means 80. The transmission mechanism 22 is rigidly locked with the housing 18 to prevent a back-driving movement of said mechanism with the force exerted by the fluid on the screw 24. In the static position of the assembly 10, the locking mechanism 23 forms coupling means between the transmission mechanism 22 and the housing 18.

Besides, with the use of the elastic springs 82 which radially act on the friction means 80 and exert a radial force directed towards the housing 12, the radial friction contact between said housing and the friction means 80 is maintained even with a wear of the friction ring 88. The elastic springs 82 enable to achieve a permanent radial contact between the friction ring 88 and the housing 12.

In case of wear of the friction ring 88, under the radial action exerted by the elastic springs 82, the friction means 80 move radially relative to transmission mechanism 22 and to the support ring 84 towards the housing 18. In this case, the pins 90 acts as guiding means during the radial displacement of the friction means 80. The radial deformation of the support member 86 makes possible said radial movement of the friction means 80. In the illustrated example, the support member 86 is deformable in radial direction with the use of the two half-ring 87a, 87b. Alternatively, the support member 86 may for example consist of an annular part having flexible portion(s) to enable such a radial deformation. The radial load of the elastic springs 82 pre-stresses the friction means 80 towards the housing 18. This load therefore makes it possible to take-up any radial clearance if a wear of the friction ring 88 occurs. The elastic springs 82 thus make it possible to achieve a permanent radial friction contact between the friction means 80 and the housing 18.

In this first illustrated example, the invention has been illustrated on the basis of a valve operator assembly 10 for gate valve comprising an inverted roller screw mechanism 22. This leads to a high load capacity of the assembly 10 since the inverted roller screw mechanism thread geometry can be larger than with other type of roller screw mechanism since there is no minimum number of starts required. This increases load capacity while keeping compactness advantage. Additionally, smaller lead will help to reduce drive torque. Consequently, the backdriving torque will be reduced. The lifetime of the assembly 10 is also increased. Otherwise, the required space for the assembly 10 is reduced.

However, the invention can also be applied to a valve operator assembly having other type of roller screw mechanism such as standard planetary roller screw mechanism as shown on FIG. 5.

In this second example, in which identical parts are given identical references, the valve operator assembly 10 is provided with a planetary roller screw mechanism 100 interposed between the input member 20 and the valve stem 16 of the valve gate and which comprises a nut 102 mounted coaxially about the screw 24 and provided with an inner thread, and a plurality of identical rollers 104 disposed radially between the screw 24 and the nut 102 and having a design similar to the one of the inverted roller screw mechanism as previously described. In this example, the outer thread 26 of the screw 24 has an elongated length.

The mechanism 100 also comprises two annular gear wheels 106, 108 mounted in a non-threaded part of the nut 102 and each comprising inner gear teeth meshing the gear teeth of the rollers 104 for the synchronization thereof. Each gear wheel 106, 108 axially bears against a radial surface of the nut 102 provided between the inner thread and the associated non-threaded part of said nut.

The mechanism 100 further comprises two spacer rings 110, 112 each mounted radially between the screw 24 and the associated gear wheel 106, 108, and elastic retainer rings (not referenced) each mounted in a groove formed on the bore of the associated gear wheel 106, 108 in order to axially hold the corresponding spacer ring 110, 112. Each spacer ring 110, 112 is provided with a plurality of axial through-holes inside which the studs of the rollers 104 are housed.

The mechanism 100 also comprises an outer sleeve 114 having an axial bore 114*a* having a stepped form and inside which are housed the nut 102 and the rollers 104. The nut 102 is secured to the sleeve 114. The gear wheel 108 axially bears against a radial annular shoulder of the stepped bore 114*a* of the nut. Axially on the opposite side, a retaining ring 116 is secured into said bore and axially comes into contact against the other gear wheel 106 of the mechanism.

The rolling bearings 60, 62 and the locking mechanism 23 are mounted on the outer surface of the sleeve 114. The sleeve 114 is radially interposed between the nut 102 on the one hand and the rolling bearings 60, 62 and the locking mechanism 23 on the other hand. The locking mechanism 23 is axially mounted against a flange 114*b* of the sleeve extending radially outwards the outer surface of said sleeve. The flange 114*b* is axially located at an axial end of the sleeve. In this example, the adapter sleeve 70 of the input member is secured to the flange 114*b* of the outer sleeve and axially bears against said flange. Alternatively, it could be possible to make the nut 102 and the sleeve 114 in one single part. In this case, the rolling bearings 60, 62 and the locking mechanism 23 are mounted directly on the outer surface of the nut.

When an operator applies a torque on the hand-wheel 72, this torque is transmitted to the adapter sleeve 70 and then to the outer sleeve 114 and the nut 102 of the planetary roller screw mechanism. With the rotation of the nut 102, the rollers 104 rotate on themselves and roll about the screw 24 without moving axially inside said nut. Accordingly, the screw 24 is axially or longitudinally moveable into the nut 102 and the rotational motion of a hand-wheel 72 is converted into an axial motion of the valve stem 16 of the valve gate. The locking mechanism 23 acts as previously described.

The two first illustrated examples respectively deal with an inverted roller screw mechanism and a standard planetary roller screw mechanism. The invention can also be applied to a valve operator assembly having other type of roller screw mechanism wherein the rollers are deprived of outer threads but have grooves into which are engaged the threads of the screw and the nut and axially move with respect to said screw and nut. After a complete revolution, each roller is returned to its initial position by cams provided at the ends of the nut. Such mechanism is called a recirculating roller screw and may be of the standard or inverted type.

In the third example illustrated on FIG. 6, in which identical parts are given identical references, the valve operator assembly 10 is provided with a standard ball screw mechanism 120 comprising a nut 122 mounted coaxially about the screw 24 and provided with an inner thread, and a plurality of identical balls 124 disposed radially between the screw 24 and the nut 122 and which engage the thread of said nut and the thread 126 of the screw. The nut 122 is mounted into the bore 114*a* of the outer sleeve 114 and axially bears against a radial annular shoulder of said bore. Axially on the opposite side, the retaining ring 116 is secured into the bore 114*a* of the outer sleeve and axially comes into contact against the nut 122. The nut 122 is secured to the outer sleeve 114. Alternatively, the nut 122 and the sleeve 114 may be made into one part. The nut 122 comprises recirculating means 128, 130 mounted into its thickness to achieve the recirculation of the balls 124. Such mechanism is called a standard ball screw. Alternatively, recirculating means may be provided on the screw. Such mechanism is called an inverted ball screw.

Otherwise, the invention can also be applied to a valve operator assembly having other type of transmission mechanism adapted to convert a rotation into a linear movement, for instance a directed threaded connection. However, such transmission mechanism requires large actuation torques.

In the illustrated examples, the lock mechanism 23 is radially interposed between the housing 18 and the rotating nut of the transmission mechanism. Alternatively, the locking mechanism 23 may be interposed between the housing 18 and the sleeve 70 of the transmission mechanism. However, with such disposition, the axial required space of the assembly 10 is increased. In another variant, it also possible to dispose the locking mechanism 23 radially between the housing 18 and the rotating nut of the transmission mechanism and axially between the two rolling bearings 62, 64 which are in this case spaced apart axially one to another.

In the disclosed examples, the friction means 80 radially bear against the housing 18, the springs 82 and the support ring 84 being disposed inside the bore of said friction means. In a variant, it could be possible to have an inverted arrangement with friction means radially bearing against the transmission mechanism 22 and with springs 82 and support ring 84 radially disposed between said friction ring and the housing 18. In this case, the support ring 88 is secured on the bore 18*a* of the housing and the friction ring 88 radially bears directly on the transmission mechanism 22 or indirectly by the use of the sleeve 66. The springs 82 exert on the friction means 80 a radial force directed inwards in order to maintain a radial friction contact between said friction means and the transmission mechanism 22. However, with the arrangement of the locking mechanism 23 as shown on the Figures, the friction ring 88 is simple to replace in case of excessive wear.

In the illustrated examples, the friction means 80 comprise a friction ring 88 and a support member 86. Alternatively, the friction means may only comprise a friction ring. In this case, the elastic springs bear directly on the friction ring.

In the previous examples, a plurality of compression springs 82 are provided to bias the friction means 80 against the associated transmission mechanism 22 or housing 18. Alternatively, it is also possible to provide other mechanical actuators to exert a radial preload on the friction means 80, such as elastic torsion spring or axially elastic washers which may be stacked. Said washers may be of the Belleville type. The number of mechanical actuator(s) may also be increased or reduced. In another variant, it could also possible to foresee only one pre-stressing or preloaded element having a toroidal form and made from elastic material, for example an elastomer such as nitrile rubber or polyurethane. Alternatively, it could also be possible to provide a pre-stressing element which exerts an axial preload combined with a taper shape of the friction means 80 to preload said friction means.

Although the invention has been illustrated on the basis of a valve operator comprising a screw connected to the valve stem of the gate and a nut connected to the input member, it should be understood that the invention can be applied with a screw connected to the input member and a nut connected to the valve stem. In this case, the nut acts as the translating element and the screw acts as the rotating element. Accordingly, the locking mechanism may be interposed between the screw and the housing. Although the invention has been illustrated on the basis of a valve operator assembly for gate valve, it should be understood that the invention can also be used with other types of valves, for instance control or regulation valves or choke valves. The valve operator assembly may be used for instance with a surface gate or a subsea valve gate which may be actuated by a remote operating vehicle (ROV) or actuator.

The invention claimed is:

1. A valve operator assembly for a valve comprising a valve body and a valve translating member axially moveable, the assembly comprising
   a housing adapted to be mounted on the valve,
   an input member rotatably mounted with respect to said housing, and
   a transmission mechanism comprising a translating element adapted to be connected to the valve translating member of the valve and a rotating element connected to the input member, said transmission mechanism being adapted to convert applied rotation of the input member into axial translation of said translating element,
   characterized in that the assembly further comprises at least one locking mechanism radially interposed between the transmission mechanism and the housing, the locking mechanism comprising friction means in radial contact with the housing, or with the transmission mechanism, and
   at least one pre-stressing element acting on said friction means to maintain said radial contact, the pre-stressing element and the friction means cooperating together to lock the transmission mechanism with the housing in a static position of said assembly, wherein the locking mechanism further comprises a support ring mounted on the transmission mechanism, or on the housing, and having at least a recess into which the pre-stressing element is mounted.

2. The valve operator assembly according to claim 1, wherein the friction means are adapted to create a friction torque between said friction means and the housing, or the transmission mechanism, so that the total friction torque of the assembly is greater than or equal to a backdriving torque of said transmission mechanism.

3. The valve operator assembly according to claim 2, wherein the friction means are adapted to create a friction torque greater than or equal to said backdriving torque.

4. The valve operator assembly according to claim 1, wherein the pre-stressing element acts radially on said friction means.

5. The valve operator assembly according to claim 1, wherein the friction means are movable in radial direction relative to the transmission mechanism and to the housing under the action of the pre-stressing element.

6. The valve operator assembly according to claim 1, wherein the friction means are fixed together with the transmission mechanism, or with the housing, in circumferential direction.

7. The valve operator assembly according to claim 1, wherein the pre-stressing element is mounted in radial contact with the friction means.

8. The valve operator assembly according to claim 1, wherein the friction means are mounted in radial contact with the support ring.

9. The valve operator assembly according to claim 1, wherein the pre-stressing element is radially located between the support ring and the friction means.

10. The valve operator assembly according to claim 1, wherein the friction means comprise a friction ring radially bearing against the housing, or the transmission mechanism.

11. The valve operator assembly according to claim 10, wherein the friction means further comprise a support member onto which is mounted the friction ring radially on the side opposite to the pre-stressing element.

12. The valve operator assembly according to claim 11, wherein the support member is deformable at least in radial direction.

13. The valve operator assembly according to claim 1, wherein the locking mechanism comprises a plurality of pre-stressing elements.

14. The valve operator assembly according to claim 1, wherein the pre-stressing element(s) comprise(s) mechanical actuator(s).

15. The valve operator assembly according to claim 1, wherein the transmission mechanism comprises a screw, a nut surrounding and coaxial with said screw, and a plurality of rolling elements radially disposed between the screw and the nut.

16. A valve comprising a valve body, a valve translating member axially moveable and a valve operator assembly, the assembly comprising a housing adapted to be mounted on the valve, an input member rotatably mounted with respect to said housing, and a transmission mechanism comprising a translating element adapted to be connected to the valve translating member of the valve and a rotating element connected to the input member, said transmission mechanism being adapted to convert applied rotation of the input member into axial translation of said translating element characterized in that the assembly further comprises at least one locking mechanism radially interposed between the transmission mechanism and the housing, the locking mechanism comprising friction means in radial contact with the housing, or with the transmission mechanism, and at least one pre-stressing element acting on said friction means to maintain said radial contact, the pre-stressing element and the friction means cooperating together to lock the transmission mechanism with the housing in a static position of said assembly, wherein the locking mechanism further comprises a support ring mounted on the transmission mechanism, or on the housing, and having at least a recess into which the pre-stressing element is mounted.

* * * * *